United States Patent [19]
Gal et al.

[11] Patent Number: 4,717,958
[45] Date of Patent: Jan. 5, 1988

[54] POSITION-STABILIZED IMAGE CONVERTER SYSTEM

[75] Inventors: Eliyahu Gal, Ramat-Gan; Naftaly Fontyn, Necher, both of Israel

[73] Assignee: Elbit Computers Ltd., Haifa, Israel

[21] Appl. No.: 866,752

[22] Filed: May 27, 1986

[30] Foreign Application Priority Data

Jul. 5, 1985 [IL] Israel .................................. 75728

[51] Int. Cl.$^4$ ............................................. H04N 5/21
[52] U.S. Cl. ......................................................... 358/222
[58] Field of Search ........................... 358/222; 350/500

[56] References Cited

U.S. PATENT DOCUMENTS

| | | | |
|---|---|---|---|
| 3,761,615 | 9/1973 | Wreathall | 358/222 |
| 4,263,623 | 4/1981 | Woo et al. | 358/909 |
| 4,403,256 | 9/1983 | Green et al. | 358/222 |

Primary Examiner—Thomas W. Brown
Assistant Examiner—Stephen Brinich
Attorney, Agent, or Firm—Benjamin J. Barish

[57] ABSTRACT

An image converter system comprises an image sensor producing an electrical signal corresponding to the sensed light intensity; a change-in-position sensor physically coupled to the image sensor so as to be moved therewith and to produce output signals corresponding to the changes in position of the image sensor; and a control cirucit for shifting the electrical signals produced by the image sensor according to the changes in position of the image sensor as sensed by the change-in-position sensor, to compensate for the changes in position and thereby to position-stabilize the electrical output of the image sensor.

19 Claims, 4 Drawing Figures

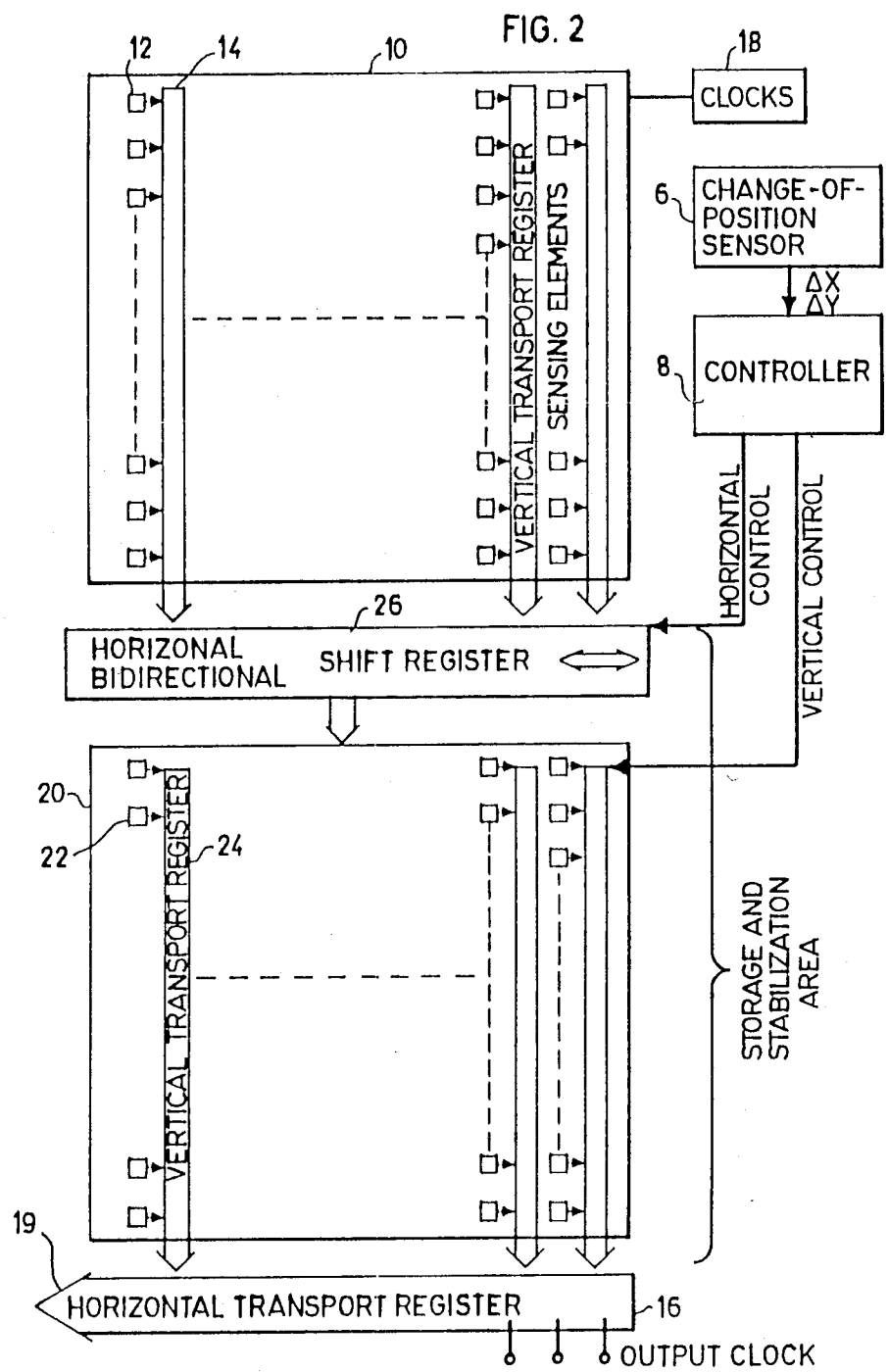

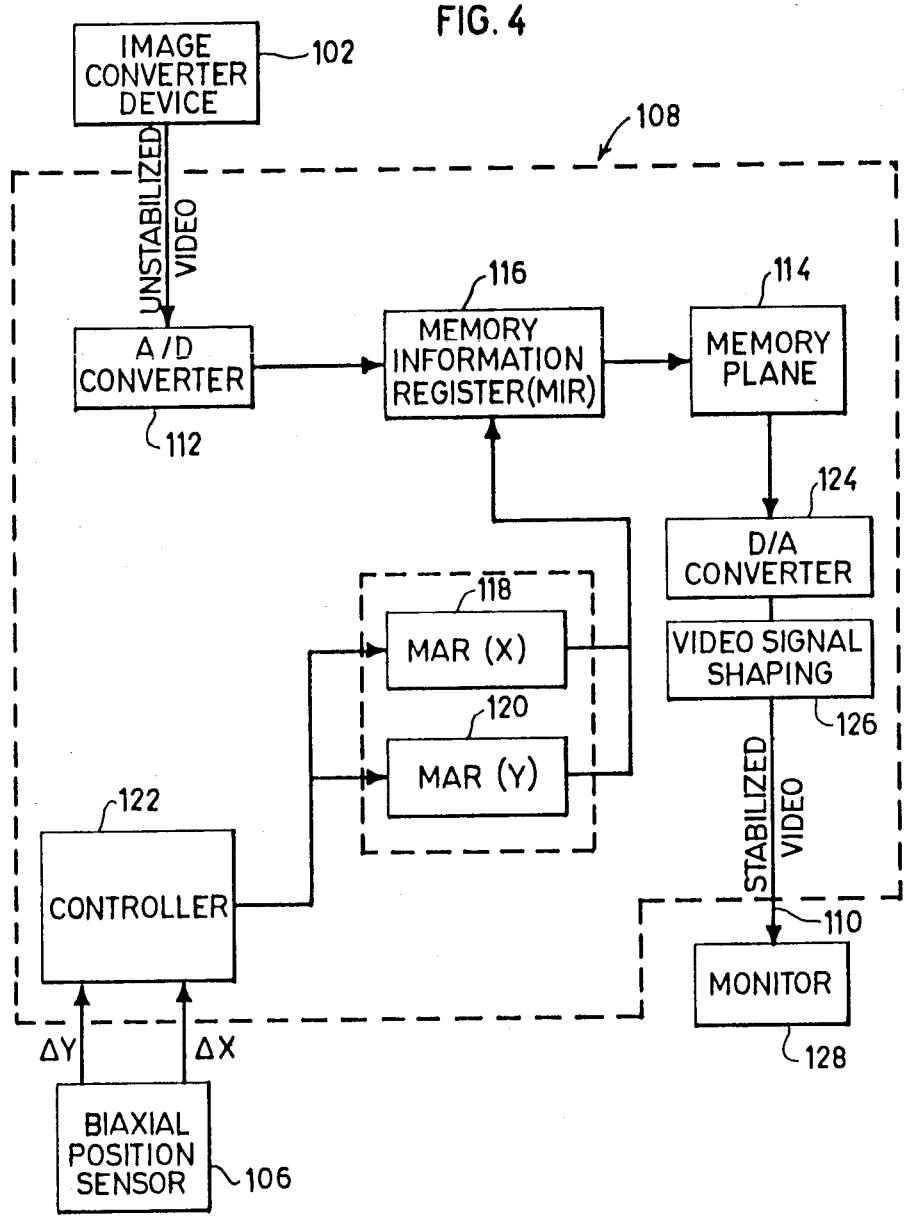

POSITION-STABILIZED IMAGE CONVERTER SYSTEM

BACKGROUND OF THE INVENTION

The present invention relates to image converter systems, for converting a light image into electrical signals. Such electrical signals may be used for reproducing the image at a remote location, or may be stored or further processed.

If the image sensor in such a system is on a moving body, for example located on a moving vehicle, or carried by a moving person, a problem arises in stabilizing the image with respect to changes in position of the image sensor. One way of doing this is to stabilize the image sensor itself, e.g. by mounting it on a stabilized platform, but such an arrangement would be complicated, costly and bulky.

SUMMARY OF THE INVENTION

An object of the present invention is to provide an image converter system having means for electronically stabilizing the image against changes in position.

According to a broad aspect of the present invention, there is provided an image converter system, comprising: an image sensor mountable on a moving body and including an array of light sensing elements each producing an electrical signal corresponding to the light intensity sensed thereby, and means for producing an electrical output corresponding to the light image sensed by said image sensor; a change-in-position sensor physically coupled to said image sensor and mountable therewith on the moving body so as to directly sense movements in space of said moving body, and thereby of said image sensor, and to produce output signals corresponding to the changes in position of said image sensor; and control means for shifting the electrical signals produced by said image sensing elements according to the changes in position of said image sensor as sensed by said change-in-position sensor, to compensate for said changes in position and thereby to position-stabilize the electrical output of said image sensor.

According to a more specific aspect of the present invention: the image sensor is an area image sensor; the light sensing elements are arranged in a matrix array including a plurality of vertical columns and horizontal rows; the change-in-position sensor produces output signals corresponding to the changes in position of the area image sensor in both the vertical and horizontal axes; and the control means shifts the electrical signals produced by the light sensing elements according to the changes in position of the area image sensor in both the vertical and horizontal axes.

The invention is particularly useful when the area image sensor is a charge-coupled device in which the light sensing elements generate charge packets proportional to the light intensity received by them, the area image sensor further including a set of vertical transport registers, a horizontal transport register, and clock means for controlling the transport registers to produce the electrical output in the form of a series of pulses modulated according to the light sensed by the light sensing elements.

Two embodiments of the invention are described below for purposes of example.

In one described embodiment, the control means comprises: a matrix buffer including an array of storage elements corresponding to the array of light sensing elements in the area image sensor; a horizontal shift register receiving the electrical signals of the light sensing elements and the horizontal-axis change-in-position signals from the change-in-position sensor for compensating the electrical signals of the light sensing elements according to changes in position of the area image sensor along the horizontal axis; and a plurality of vertical shift registers receiving the electrical signals of the light sensing elements and the vertical-axis change-in-position signals from the change-in-position sensor for compensating the electrical signals of the light sensing elements according to changes in position of the area image sensor along the vertical axis before transferring same to the horizontal transport registers for producing the position-stabilized output.

In this embodiment, the control means may be integrated in the same integrated circuit chip with the light sensing elements and other elements of the charge-coupled device, or the control means may be constructed in a separate chip from the charge-coupled device containing the light sensing elements.

A second embodiment of the invention is described wherein the control means comprises: a memory plane having a matrix of memory elements arranged in vertical columns and horizontal rows corresponding to the matrix of light sensing elements in the area image sensor; an analog-to-digital converter converting the electrical signals from the light sensing elements to digital form; memory read-in means shifting the digital electrical signals from the light sensing elements according to the changes-in-position of the area image sensor in both the vertical and horizontal axes as sensed by the change-in-position sensor, and then storing the shifted electrical signals in the memory plane; and read-out means for outputting the shifted electrical signals from the memory plane to produce a series of pulses modulated according to the light sensed by the light sensing elements but shifted to compensate for changes-in-position of the area image sensor in both the vertical and horizontal directions.

Further features and advantages of the invention will be apparent from the description below.

BRIEF DESCRIPTION OF THE DRAWINGS

The invention is herein described, by way of example only, with reference to the accompanying drawings, wherein:

FIG. 2 is a block diagram more particularly illustrating one implementation of the system of FIG. 1;

FIG. 4 is a block diagram more particularly illustrating one implementation of the system of FIG. 3.

DESCRIPTION OF A PREFERRED EMBODIMENT

Figure 1:
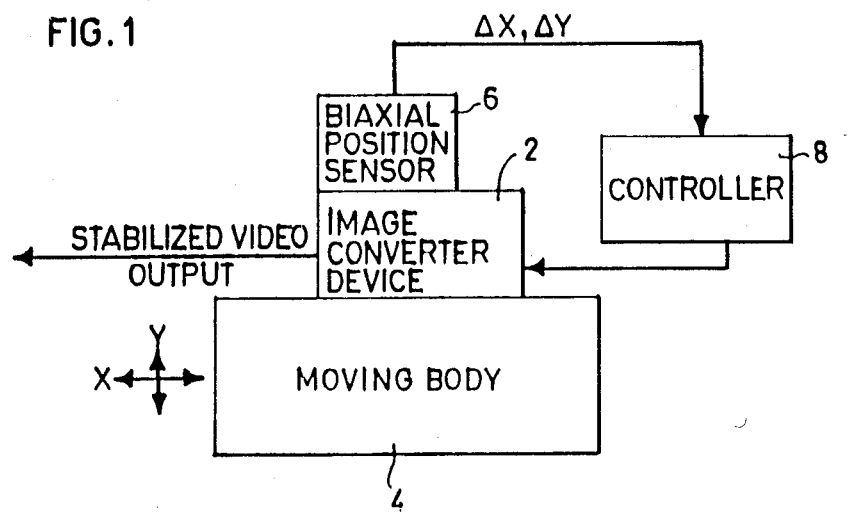
FIG. 1 is a block diagram illustrating one form of position stabilized image converter system constructed in accordance with the present invention.

With reference to FIG. 1, there is illustrated a system including an image converter device which converts a light image to electrical signals, e.g., for reproducing the light image at a remote location. The image converter device 2 is mounted on a moving body 4, such as a moving vehicle, which may change the position of the image converter device 2 along both the horizontal and vertical axes. These movements of body 4 are transmitted to the image converter device 2 so that its output will reflect the movements. In order to stabilize the output of image converter device, a bi-axial position sensor 6 is mounted on the image converter device and produces electrical outputs ($\Delta X$, $\Delta Y$) corresponding to the changes in position of device 2 along both the horizontal and vertical axes. These output signals from the change-in-position sensor 6 are transmitted to a controller 8 which controls the image converter device 2 in order to compensate for these changes in position, which thereby position-stabilizes the electrical output from the image converter device 2.

FIG. 2 illustrates one implementation of the system illustrated in FIG. 1.

In the system illustrated in FIG. 2, the image converter device includes an area image sensor in the form of a charge-coupled device having a matrix array 10 of light sensing elements 12 arranged in a plurality of vertical columns and horizontal rows. As well known, these light sensing elements generate charge packets proportional to the light intensity received by them. As also well known in such charge-coupled devices, they include a set of vertical transport registers, generally designated 14, a horizontal transport register, generally designated 16, and clock means, generally designated 18, controlling the transport registers to produce an electrical output at 19 in the form of a series of pulses modulated according to the light sensed by the light sensing elements 12.

Such charge-coupled devices have been known since about 1970 and are thoroughly described in a large number of publications, for example the publication titled "Charge-Coupled Devices: Technology and Applications", edited by Roger Melen and Dennis Buss, the Institute of Electrical and Electronic Engineers, Inc., New York, 1976. In addition, a large number of such devices are now available on the market. Accordingly, further details of their construction and operation are not described herein.

The system illustrated in FIG. 2 further includes the two-axes position sensor 6 which produces the $\Delta X$ and $\Delta Y$ output signals representing the changes in position of the moving body 4, and thereby of the image converter device 2. These signals are outputted to controller 8 which, as mentioned earlier, shifts the electrical signals produced by the light sensing elements 12 according to the change-in-position signal $\Delta X$, $\Delta Y$, to compensate for these changes in position and thereby to position-stabilize the electrical output 19.

In the embodiment illustrated in FIG. 2, the latter control means include, in addition to controller 8, a matrix buffer 20 including an array of storage elements 22 arranged in a matrix of vertical columns and horizontal rows corresponding to the matrix of light sensing elements 12 of the area image converter 10. Each vertical column of memory elements 22 is separated by a vertical shift register 24. The control means further includes a horizontal, bi-directional shift register 26.

Controller 8 produces, as a result of the change-in-position signals received from the position sensor 6, horizontal control signals which are applied to the horizontal shift register 26, and vertical control signals which are applied to the vertical shift registers 24. Thus, the horizontal control signals applied to the horizontal shift register 26 compensate the outputs of the light sensing elements 12 for any changes in position in the horizontal direction, and the vertical control signals applied to the vertical shift registers 24 compensate the output signals of the light sensing elements 12 for any changes in position in the vertical direction. Accordingly, the output from the horizontal transport register 16 will be in the form of a series of pulses modulated according to the light sensed by the light sensing elements 12 but compensated for both vertical and horizontal displacements of these sensing elements so that these signals, appearing at output 19, will be electronically stabilized with respect to these positional changes.

The capability of the known charge-coupled devices for manipulating information in the form of discrete charge packets makes them ideally suited for use in the image converter system of the present invention. Preferably, the matrix buffer 20, including the matrix of storage element 22 and the vertical shift registers 24, and also the bi-directional horizontal shift register 26, are incorporated into the same integrated circuit chip as the light sensing elements 12 of the area image sensor 10, including its vertical transport registers 14 and horizontal transport register 16. However, for systems requiring lower resolution and/or lower frame rates, lhe matrix buffer 20, including its vertical shift registers 24 and horizontal shift register 26, may be embodied in one or more chips separate from that of the area image sensor 10.

Figure 3:
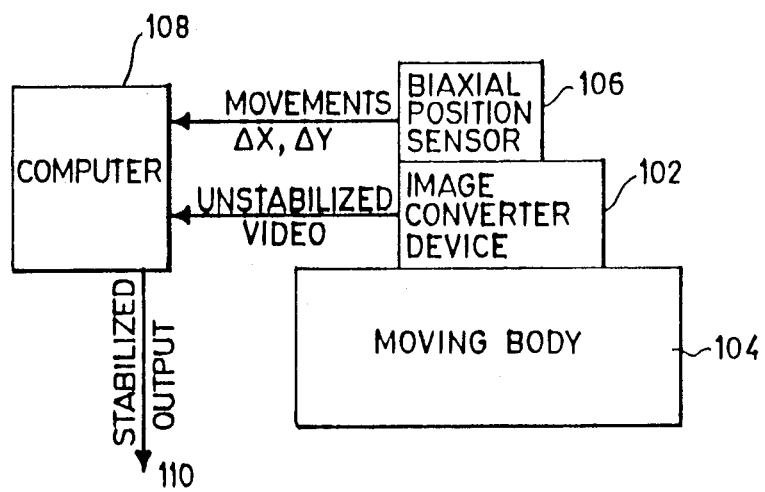
FIG. 3 is a block diagram illustrating a second image converter system constructed in accordance with the present invention.

FIG. 3 illustrates another embodiment of the invention, and FIG. 4 illustrates one implementation of the embodiment of FIG. 3. This embodiment also includes an image converter device 102 mounted on a moving body 104 and coupled to a bi-axial position sensor 106 producing output signals corresponding to the changes in position of device 102 in both the horizontal and vertical directions. The outputs of both the image converter device 102 and the position sensor 106 are inputted into a computer 108 which compensates the unstabilized electrical signals received from the image converter device 102 for positional changes, the computer producing the stabilized output at 110.

As shown more particularly in FIG. 4, computer 108 includes an analog-to-digital converter 112 converting the analog information from the light sensing elements of the image converter device 102 to digital form. Image converter 102 is preferably a charge-coupled device similar to image converter 2 in FIG. 1 but of conventional construction that is, it does not include the electronic compensation for positional changes, since such compensation is performed in computer 108 in the embodiment of FIGS. 3 and 4.

Computer 108 further includes a memory plane 114 having a matrix of memory elements arran9éd in vertical columns and horizontal rows corresponding to the matrix of light sensing elements 12 in the FIGS. 1, 2 embodiment. The input of the digital signals from converter 112, as derived from the light sensing elements of the image converter device 102, is controlled by a Memory Instruction Register (MIR) 116: MIR 116 is in turn controlled by two further registers, namely Memory-Address-Register-X, (MAR-X) 119, and Memory-Address-Register-Y, (MAR-Y) 120. These latter registers are presettable counters and are preset by the outputs of the position sensor 106 via controller 122 so as to control the input of the information stream from MIR 116 into the proper places in the memory plane 114 such as to compensate for the positional displacements sensed by sensor 106.

This information is read out of memory plane 114 into a digital-to-analog converter 124 which converts the information back to analog form. The analog information is then shaped by a video-signal shaping circuit 126 and outputted via output 110 in the form of position-stabilized video information. This output may be transmitted to a monitor 128 for reproducing the image but in position-stabilized form. Alternatively, the stabilized output 110 may be stored or further processed.

Following are examples of presently-available components which may be used in the above-described systems:

Among the may known area image sensors which may be used for sensor 10 in FIG. 2 or 102 in FIG. 4, is the Fairchild CCD 222, but modified to include another horizontal bi-directional shift register and another set of vertical shift registers controlled by the change-in-position sensor for positional displacement of the area image sensor to stabilize the pictures. Another area image sensor that may be used is the RCA SID 51232, or the Thompson-CSF TH7851, both of which have separate areas for image and storage.

Also commercially available and usable in the described system, particularly that of FIG. 4, is MATROX MIP512 containing an analog-to-digital converter, MIR, memory plane, digital-to-analog converter, and video signal shaping circuit, corresponding to blocks 112, 114, 116, 124 and 126, respectively in FIG. 4. For the MAR-X and MAR-Y, blocks 118 and 120, respectively, in FIG. 4, there may be used two presettable counters Texas Instruments 74195 or Fairchild 74195; two such units are needed for each direction since each of the above units is of four-bit precision, whereas eight-bit precision is desired in the system.

For the change-in-position sensor 6 (FIGS. 1, 2) or 106 (FIGS. 3, 4), a large number of such sensors are known and commercially available, for example rate gyros, and accelerometer.

While the invention has been described with respect to two preferred embodiments, it will be appreciated that many other variations, modifications and applications of the invention may be made.

What is claimed is:

1. An image converter system comprising:
an image sensor mountable on a moving body and including an array of light sensing elements each producing an electrical signal corresponding to the light intensity sensed thereby, and means for producing an electrical output corresponding to the light image sensed by said image sensor;
a change-in-position sensor physically coupled to said image sensor and mountable therewith on the moving body so as to directly sense movements in space of said moving body and thereby of said image sensor, and to produce output signals corresponding to the changes in position in space of said image sensor;
and control means for shifting the electrical signals produced by said image sensing elements according to the changes in position of said image sensor as sensed by said change-in-position sensor, to compensate for said changes in position and thereby to position-stabilize the electrical output of said image sensor.

2. The system according to claim 1 wherein:
said image sensor is an area image sensor;
said light sensing elements are arranged in a matrix array including a plurality of vertical columns and horizontal rows,
said change-in-position sensor produces output signals corresponding to the changes in position of the area image sensor in both the vertical and horizontal axes,
and said control means shifts the electrical signals produced by said light sensing elements according to the changes in position of said area image sensor in both the vertical and horizontal axes.

3. The system according to claim 2, wherein said area image sensor is a charge-coupled device in which said light sensing elements generate charge packets proportional to the light intensity received by them, said area image sensor further including a vertical transport register, a horizontal transport register, and clock means for controlling said transport registers to produce said electrical output in the form of a series of pulses modulated according to the light sensed by said light sensing elements.

4. The system according to claim 3, wherein said control means comprises:
a matrix buffer including an array of storage elements corresponding to the array of light sensing elements in the area image sensor;
a horizontal shift register receiving the electrical signals of the light sensing elements and horizontal-axis change-in-position signals from the change-in-position sensor for compensating the electrical signals of the light sensing elements according to changes in position of the area image sensor along the horizontal axis;
and a plurality of vertical shift registers receiving the electrical signals of the light sensing elements and the vertical-axis change-in-position signals from the change-in-position sensor for compensating the electrical signals of the light sensing elements according to changes in position of the area image sensor along the vertical axis before transferring same to the horizontal transport registers for producing said position-stabilized output.

5. The system according to claim 4, wherein said light sensing elements, vertical and horizontal transport registers of the charge-coupled device, and said vertical and horizontal shift registers of the control means, are all included in a common integrated circuit chip.

6. The system according to claim 4, wherein said light sensing elements, and vertical and horizontal transport registers of the charge-coupled device are included in one integrated circuit chip, and said vertical and horizontal shift registers of the control means are included in a separate integrated circuit chip.

7. The system according to claim 3, wherein said control means comprises:
a memory plane having a matrix of memory elements arranged in vertical columns and horizontal rows corresponding to the matrix of light sensing elements in said area image sensor;
an analog-to-digital converter converting the electrical signals from the light sensing elements to digital form;
memory read-in means shifting the digital electrical signals from the light sensing elements according to the changes-in-position of said area image sensor in both the vertical and horizontal axes as sensed by said change-in-position sensor, and then storing said shifted electrical signals in said memory plane
and read-out means for outputting said shifted electrical signals from said memory plane to produce a series of pulses modulated according to the light sensed by said light sensing elements but shifted to compensate for changes-in-position of the area image sensor in both the vertical and horizontal directions.

8. The system according to claim 7, wherein said memory read-in means comprises:
   a Memory-Address-Register-X (MAR-X), and a Memory-Address-Register-Y (MAR-Y) receiving the changes-in-position signals from the change-in-position sensor in the horizontal and vertical axes, respectively;
   and a Memory-Instruction-Register (MIR) temporarily storing the output from said analog-to-digital converter;
   said MIR being controlled by said MAR-X and MAR-Y to read into the memory plane the digital electrical signals from said analog-to-digital converter in the shifted positions of the memory plane as controlled by said MAR-X and MAR-Y.

9. The system according to claim 1, wherein said change-in-position sensor is a rate gyro.

10. The system according to claim 1, wherein said change-in-position sensor is an accelerometer.

11. An image converter system comprising:
   an area image sensor including an array of light sensing elements each producing an electrical signal corresponding to the light intensity sensed thereby, and means for producing an electrical output corresponding to the light image sensed by said image sensor;
   a change-in-position sensor physically coupled to said image sensor so as to be moved therewith and to produce output signals corresponding to the changes in position of said image sensor;
   and control means for shifting the electrical signals produced by said image sensing elements according to the changes in position of said image sensor as sensed by said change-in-position sensor, to compensate for said changes in position and thereby to position-stabilize the electrical output of said image sensor; said control means comprising:
   a memory plane having a matrix of memory elements arranged in vertical columns and horizontal rows corresponding to the matrix of light sensing elements in said area image sensor;
   an analog-to-digital converter converting the electrical signals from the light sensing elements to digital form;
   memory read-in means shifting the digital electrical signals from the light sensing elements according to the changes-in-position of said area image sensor in both the vertical and horizontal axes as sensed by said change-in-position sensor, and then storing said shifted electrical signals in said memory plane;
   and read-out means for outputting said shifted electrical signals from said memory plane to produce a series of pulses modulated according to the light sensed by said light sensing elements but shifted to compensate for changes-in-position of the area image sensor in both the vertical and horizontal directions.

12. The system according to claim 11, wherein:
   said light sensing elements are arranged in a matrix array including a plurality of vertical columns and horizontal rows,
   said change-in-position sensor produces output signals corresponding to the changes in position of the area image sensor in both the vertical and horizontal axes,
   and said control means shifts the electrical signals produced by said light sensing elements according to the changes in position of said area image sensor in both the vertical and horizontal axes.

13. The system according to claim 12, wherein said area image sensor is a charge-coupled device in which said light sensing elements generate charge packets proportional to the light intensity received by them, said area image sensor further including a vertical transport register, a horizontal transport register, and clock means for controlling said transport registers to produce said electrical output in the form of a series of pulses modulated according to the light sensed by said light sensing elements.

14. The system according to claim 13, wherein said control means comprises:
   a matrix buffer including an array of storage elements corresponding to the array of light sensing elements in the area image sensor;
   a horizontal shift register receiving the electrical signals of the light sensing elements and horizontal-axis change-in-position signals from the change-in-position sensor for compensating the electrical signals of the light sensing elements according to changes in position of the area image sensor along the horizontal axis;
   and a plurality of vertical shift registers receiving the electrical signals of the light sensing elements and vertical-axis change-in-position signals from the change-in-position sensor for compensating the electrical signals of the light sensing elements according to changes in position of the area image sensor along the vertical axis before transferring same to the horizontal transport registers for producing said position-stabilized output.

15. The system according to claim 14, wherein said light sensing elements, vertical and horizontal transport registers of the charge-coupled device, and said vertical and horizontal shift registers of the control means, are all included in a common integrated circuit chip.

16. The system according to claim 14, wherein said light sensing elements, and vertical and horizontal transport registers of the charge-coupled device are included in one integrated circuit chip, and said vertical and horizontal shift registers of the control means are included in a separate integrated circuit chip.

17. The system according to claim 11, wherein said memory read-in means comprises:
   a Memory-Address-Register-X (MAR-X), and a Memory-Address-Register-Y (MAR-Y) receiving the changes-in-position signals from the change-in-position sensor in the horizontal and vertical axes, respectively;
   and a Memory-Instruction-Register (MIR) temporarily storing the output from said analog-to-digital converter;
   said MIR being controlled by said MAR-X and MAR-Y to read into the memory plane the digital electrical signals from said analog-to-digital converter in the shifted positions of the memory plane as controlled by said MAR-X and MAR-Y.

18. The system according to claim 11, wherein said change-in-position sensor is a rate gyro.

19. The system according to claim 11, wherein said change-in-position sensor is an accelerometer.

* * * * *